(No Model.)
D. R. JOHNSON.
STUMP PULLER.
No. 584,638. Patented June 15, 1897.
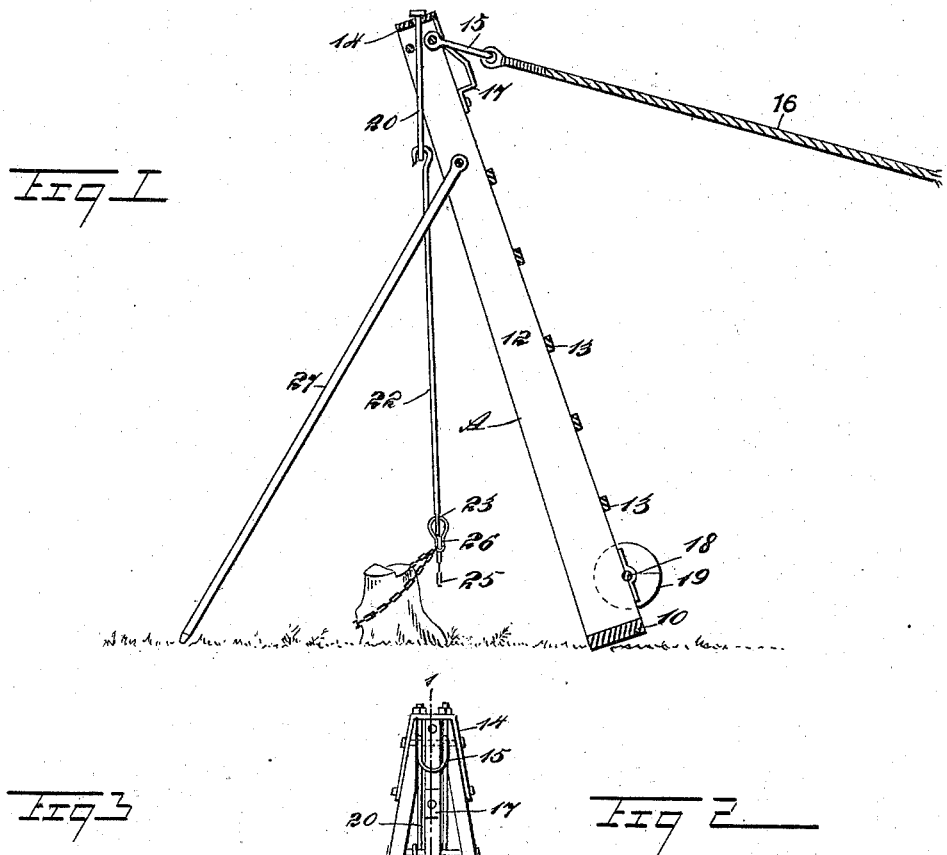
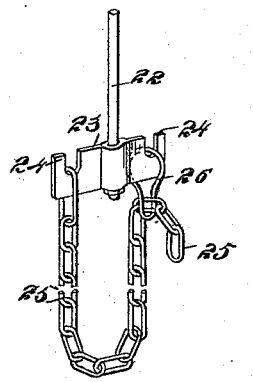
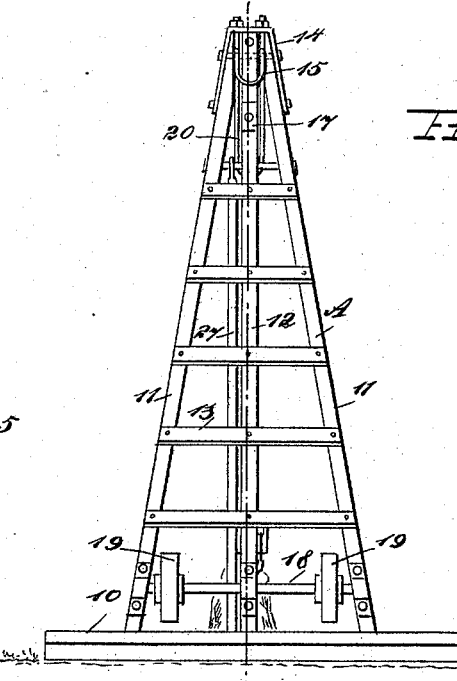
WITNESSES:
INVENTOR
D. R. Johnson.
BY
ATTORNEYS.

UNITED STATES PATENT OFFICE.

DANIEL R. JOHNSON, OF BLACKSHEAR, GEORGIA.

STUMP-PULLER.

SPECIFICATION forming part of Letters Patent No. 584,638, dated June 15, 1897.

Application filed January 30, 1897. Serial No. 621,344. (No model.)

*To all whom it may concern:*

Be it known that I, DANIEL R. JOHNSON, of Blackshear, in the county of Pierce and State of Georgia, have invented a new and Improved Stump-Puller, of which the following is a full, clear, and exact description.

The object of my invention is to provide a stump-puller of exceedingly simple, durable, and economic construction, capable of being expeditiously and conveniently set up over a stump and of being manipulated in a manner to quickly remove the same from the ground with the least possible amount of exertion on the part of the operator.

Another object of the invention is to so construct the stump-puller that at or about the time the stump leaves the ground the stump-puller will be in practically a horizontal position and will serve as a truck to convey said stump to any place desired.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a vertical section taken substantially on the line 1 1 of Fig. 2. Fig. 2 is a front elevation of the stump-puller, and Fig. 3 is a detail perspective view of the lower portion of the pull-rod and the chain used in connection with the same.

The frame A constitutes the body portion of the stump-puller, the frame being narrow at the top and wide at the bottom. The frame consists, preferably, of two side pieces 11, secured at their lower ends upon a sill 10, together with a central longitudinal bar 12 and cross-bars 13, the latter constituting rungs whereby when the machine is set up the top portion of the machine may be readily reached. The upper ends of the beams 11 and 12 are brought together and are secured in any suitable or approved manner, usually through the medium of a cap-strap 14. A clevis 15 is pivotally attached to the upper portion of the frame.

When the stump to be pulled is small or of medium size, a rope 16 is attached directly to the clevis. When, however, the stump is very large, it may be necessary to attach a block to the clevis 15 and a second block to an adjacent support, a rope being passed through both blocks, forming a tackle. When the stump has been pulled, the frame A is used in the capacity of a vehicle to remove said stump and place it wherever desired. To that end a drag foot or runner 17 is secured to the front face of the frame at the top, and a shaft 18 is journaled upon the same face of the frame near its bottom, end wheels 19 being located on the said shaft. When the frame is used as a vehicle, its front face will be its under face.

A second clevis 20 is pivoted at the upper portion of the cap-strap 14, straddling the center beam 12. A pull-rod 22 is attached to the clevis 20, and the said rod at its lower end is pivotally connected with a block or a plate 23. This block or plate 23, which constitutes the head for the pull-rod, is provided at each end in its upper edge with a recess 24. One end of a chain 25, designed to be passed around the stump to be pulled, is connected with one end of the head 23, one of the links being made to enter one of the recesses 24 in the head, and after the chain has been passed around the stump the other end of the chain is carried through the contracted end of the link 26, which is hung from the recessed opposite end of the head, as shown particularly in Fig. 3. A supporting-leg 27 is pivoted at one of its ends to the frame A near its contracted end and at one side of the center, so that the said leg will not be in the way as the stump is being pulled from the ground.

In operation the frame is placed in an inclined position over the stump, the sill 10 resting upon the ground, and the leg 27 is utilized to hold the frame in this position. The pull-rod will then stand quite close to the stump to be drawn and the chain will be attached to the head, passed around the stump, and attached at its free end to the link 26, through which it may be drawn until the necessary degree of security is obtained. It may be necessary when the stump is moved to pass the binding-ring over the end portions of the chain close to the stump, so as to prevent the chain from slipping.

The stump having been attached to the pull-rod the draft-rope 16 is drawn upon, and the frame, its sill serving as a fulcrum, will be drawn downward in direction of the ground. By the time the wheels 19 of the frame are brought in contact with the ground the stump will have been thoroughly loosened and will have been carried upon the frame. The frame may then be used as a truck to convey said stump wherever it may be desirable to place it, or the stump may be released from the pull-rod and the device wheeled to the next stump to be drawn.

As heretofore stated, the stump-puller is exceedingly simple, durable, and economic, and by its use stumps may be quickly drawn from the ground with a minimum of exertion on the part of the operators.

Having thus described my invention, I claim as new and desire to secure by Letters Patent—

A stump-puller having an elongated frame, consisting in longitudinal beams connected by cross-bars whereby to form a platform on which the stumps may be rested, a shaft at one end of the frame, wheels mounted on the shaft whereby to provide a rolling support for one end of the frame, a runner carried at the opposite end of the frame and coacting with the wheels, a link pivoted to one end of the frame having the runner, a rod attached to the link and adapted to hang with the link from said end of the frame which end has a runner, a head attached to the free end of the rod and projecting transversely beyond each side thereof, the head having a notch in the upper edge of each end, a chain the link at one end of which is engaged in one of the notches, and an additional link engaged within the second of the notches in the head and having a contracted lower portion capable of adjustable connection with the links of the chain.

DANIEL R. JOHNSON.

Witnesses:
ALLEN M. JOHNSON,
GEO. P. GREGORY.